March 7, 1939.    M. J. FLEMING    2,149,430
CUT-OFF MACHINE
Filed March 14, 1938    4 Sheets-Sheet 1
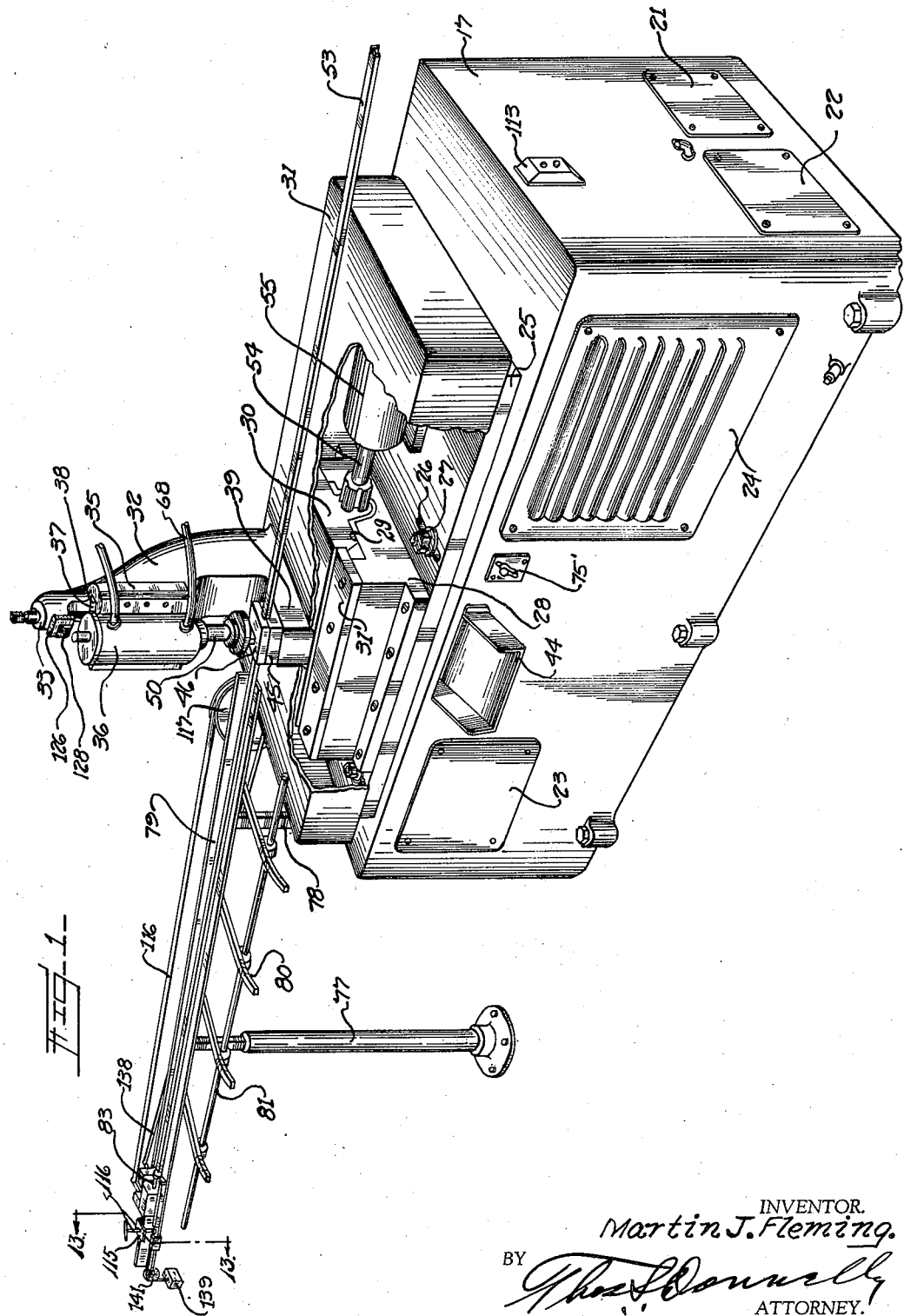
INVENTOR.
Martin J. Fleming.
BY
ATTORNEY.

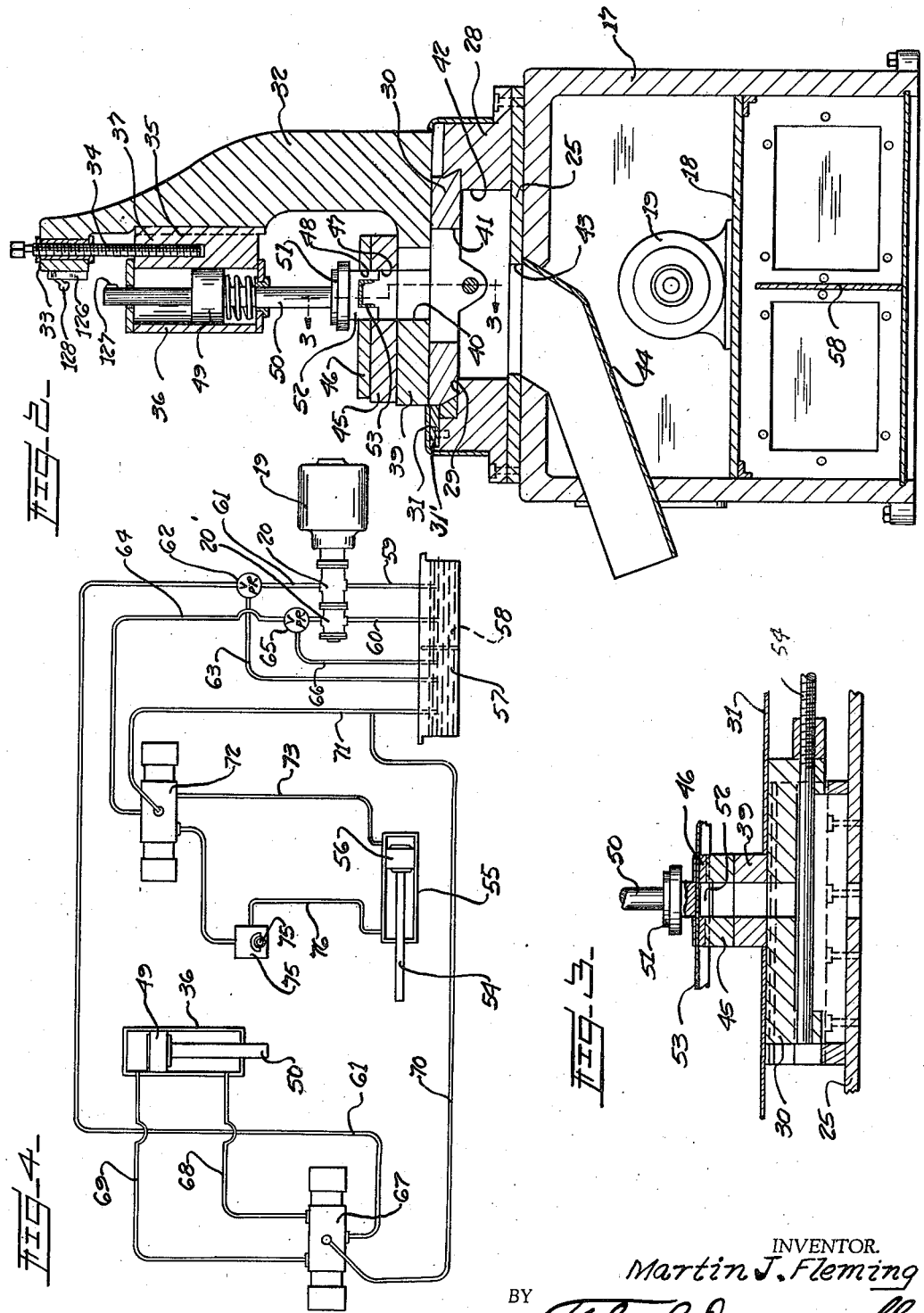

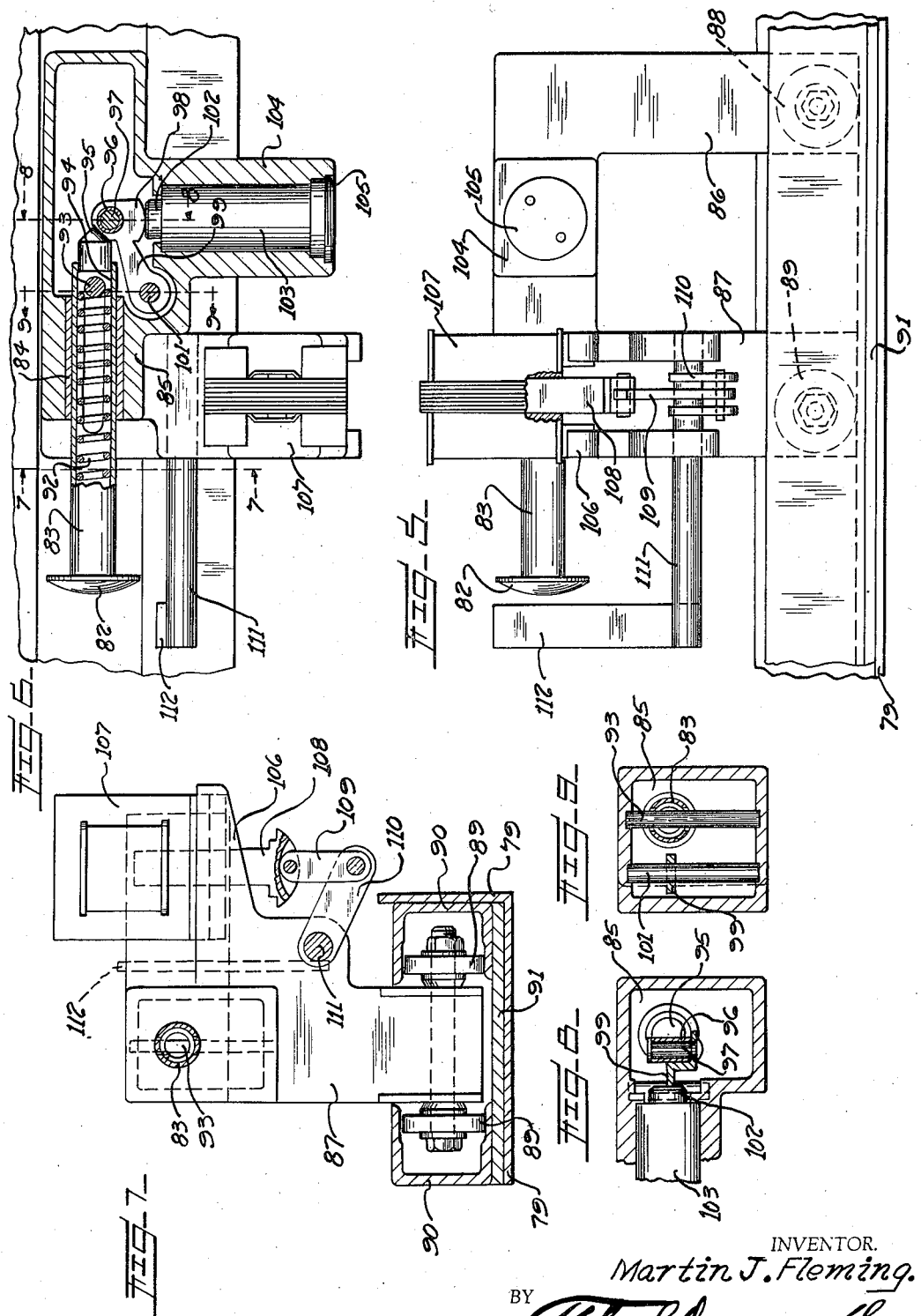

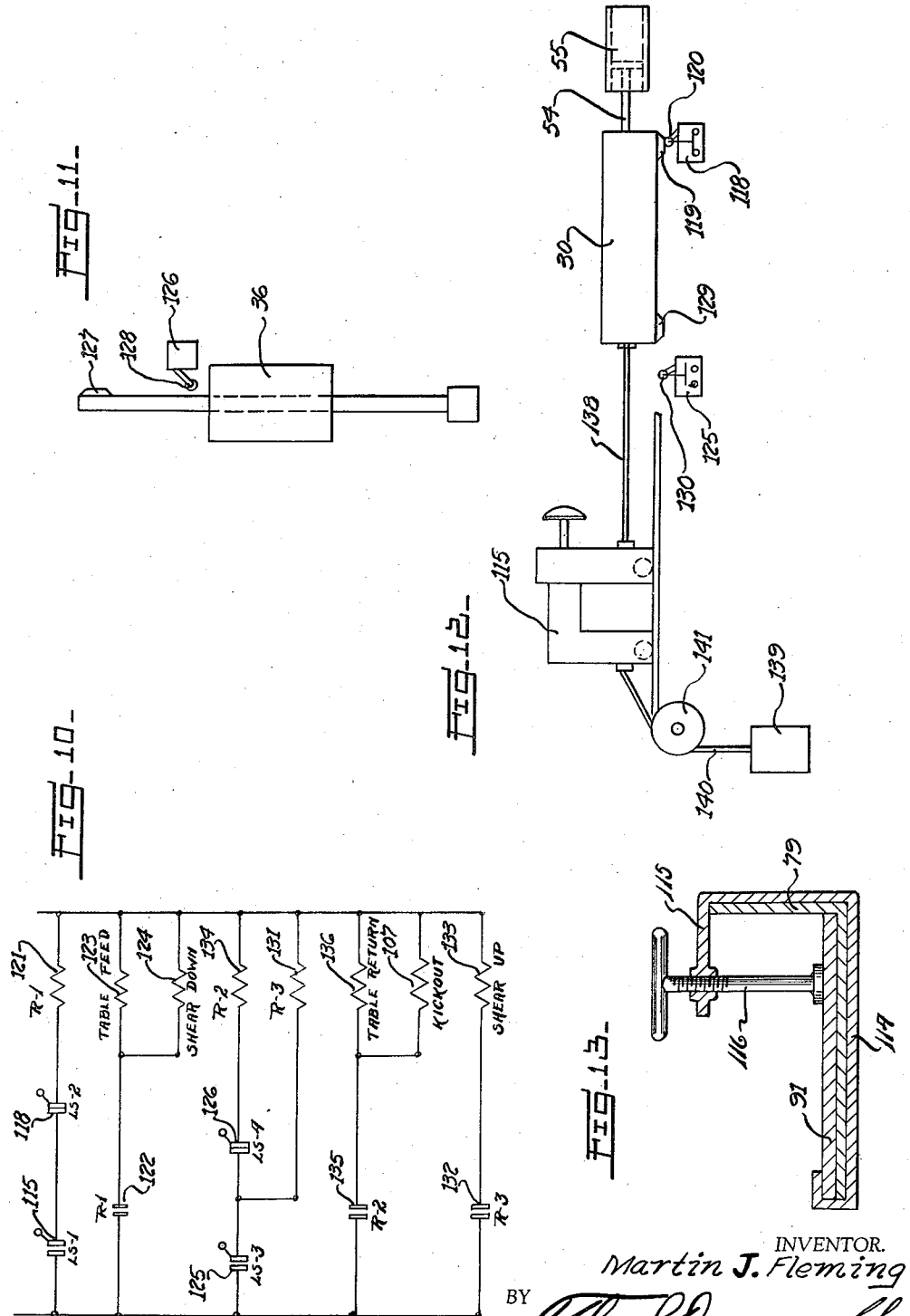

Patented Mar. 7, 1939

2,149,430

UNITED STATES PATENT OFFICE 2,149,430

CUT-OFF MACHINE

Martin J. Fleming, Detroit, Mich.

Application March 14, 1938, Serial No. 195,747

8 Claims. (Cl. 164—48)

My invention relates to a new and useful improvement in a cut-off machine adapted for use in cutting pieces of material of a definite length from a long strip. The machine is generally used in cutting pieces of material from long strips although from a description of the machine it will appear obvious that it may also be used for cutting other kinds of material. In machines of this type which are now used, the strip of material is fed at a predetermined rate and this feeding is continuous. The shearing or cutting mechanism consequently, during the cutting operation, must travel with the strip of material and after the severing operation return to its original position.

It is an object of the present invention to provide a machine of this type which will be hydraulically operated and automatically controlled.

It is another object of the invention to provide a machine of this type in which the operations will be considerably speeded up and a resulting saving in labor and time effected.

Another object of the invention is the provision in a cut-off machine of this type of a movable table hydraulically operated and of a shearing mechanism carried by said table and movable therewith and also hydraulically operated.

Another object of the invention is the provision in a machine of this type of means for easily and quickly adjusting the mechanism for determining various lengths of cut.

Another object of the invention is the provision of automatic means for discharging or kicking off the strip after the cutting operation.

Another object of the invention is the provision of a machine of this class which will be compact, durable, possessed of maximum speed and efficiency, economically manufactured, and easily operated.

Other objects will appear hereinafter.

The invention consists in the combination and arrangement of parts hereinafter described and claimed.

The invention will be best understood by a reference to the accompanying drawings which form a part of this specification, and in which, Fig. 1 is a perspective view of the invention.

Fig. 2 is a central, transverse, sectional view of the invention.

Fig. 3 is a fragmentary, sectional view taken on line 3—3 of Fig. 2.

Fig. 4 is a diagrammatic view of the piping used in the invention.

Fig. 5 is a fragmentary, side elevational view of a switch used in the invention with parts broken away.

Fig. 6 is a top plan view of the switch illustrated in Fig. 5 with parts broken away and parts shown in section.

Fig. 7 is a sectional view taken on line 7—7 of Fig. 6.

Fig. 8 is a fragmentary, sectional view taken on line 8—8 of Fig. 6.

Fig. 9 is a sectional view taken on line 9—9 of Fig. 6.

Fig. 10 is a diagrammatic view of the wiring used in the invention.

Fig. 11 is a diagrammatic view illustrating a switch operation.

Fig. 12 is a diagrammatic view of the slide illustrating a switch operation.

Fig. 13 is a tranverse sectional view taken on line 13—13 of Fig. 1.

In the drawings I have illustrated the invention as enclosed by a box-like structure 17 which serves as a bed or supporting body. Within this supporting structure is mounted a partition or supporting plate 18 upon which is mounted an electric motor 19 used for driving the hydraulic pumps 20 and 20'. Access to the interior of the member 17 may be effected through openings in the end wall closed by the plates 21 and 22 and also through an opening in the side wall closed by the plate 23 and through an opening in the side wall closed by the ventilating plate 24 which has louvres formed therein. Mounted on the top of the supporting member 17 is a plate 25 having transversely extending slots 26 formed therein through which the attaching bolts 27 may be projected so that the position of the plate 25 transversely of the supporting member 17 may be adjusted. Attached to this plate 25 is a slide bed 28. Formed in the slide bed 28 is a recess 29 in which is positioned a slide plate 30. Secured to the slide bed 28 are the lock plates 31 which overlie the end edges of the slide plate 30, this slide plate 30 riding in the recess formed in the slide bed 28. The cover 31 which may be termed a carriage is secured to and moves in unison with the slide plate 30. Projecting upwardly from one edge of the cover or carriage 31 is a standard 32 having an overhanging head 33 through which is swivelly projected the screw 34 threaded into the block 35 formed on the cylinder 36. This cylinder 36 is provided with the laterally directed flanges 37 which ride in the channels 38 formed on the standard 32. By threading of the threaded stem or screw 34, the position of the cylinder 36 vertically of the standard 32 may be adjusted. Formed integral with the standard 32 and projecting inwardly therefrom, at the base thereof, is the abutment plate or anvil 39 in which is formed an opening 40 registering with the opening 41 formed in the slide plate 30 which is positioned over the opening 42 formed in the slide bed 28. The plate 25 is also provided with an opening 43 positioned below which is one end of a discharge chute 44. Mounted on the abutment plate or anvil 39 is a die block 45 and a guide block 46 having registering openings 47 and 48, respectively, formed therein.

Slideably mounted in the cylinder 36 is a piston 49, the piston rod 50 of which carries the head 51 to which is attached the punch or die 52 which is adapted to perform the shearing operation, the members 45 and 46 having cooperating recesses formed therein to provide a channel through which the workpiece 53 may slide. As this workpiece is sheared, a small portion of it will be scrap material which will fall through the openings 47, 40, 41 and 42 into the chute 43 to be discharged through the side of the support 17. This strip 53 of material which is to be cut into proper lengths is fed longitudinally through the machine at a predetermined rate of speed by a well-known feeding mechanism which is not illustrated and which forms no part of the present invention.

Attached to the slide 30 is a piston rod 54, the connection of this piston rod to the slide 30 being an adjustable one in any well-known manner. The piston rod 54 is connected to a piston 56 slideably mounted in the cylinder 55 which is mounted on the plate 25. The piston 56 in the cylinder 55 operates to move the slide plate 30 forward and backward, that is, to the left of the drawing shown in Fig. 1 to follow the workpiece as it is fed and backwardly to the right to the starting position.

The control and operation of the shearing piston 49 and the moving piston 56 is illustrated in the diagrammatic view shown in Fig. 4. As shown in this figure, I provide a reservoir 57 having baffle or dividing partitions 58 mounted therein. The pipe 59 serves as a feed pipe to the pump 20 and the pipe 60 serves as a feed pipe for the pump 20', these pipes terminating at their lower ends beneath the liquid level in the reservoir 57. A delivery pipe 61 serves to conduct the liquid from the pump 20 and interposed in this delivery pipe is a pressure relief valve 62 which returns by the pipe 63 to the reservoir 57. An outlet delivery pipe 64 serves to deliver the liquid from the pump 20' and in this delivery pipe 64 is interposed a pressure relief valve 65 returning by the pipe 66 to the reservoir 57. The delivery pipe 61 serves to deliver the liquid for operating the shearing ram and the delivery pipe 64 serves to control the operation of the slide moving ram. This delivery pipe 61 communicates with a four-way solenoid operated valve 67 of any desireable type of construction, several makes of four-way valves of this type being already known on the market. This valve is of the stay-put type, that is, when moved to either open or closed position, it remains in that position until again positively operated. From the valve 67 proceeds the cylinder delivery pipes 68 and 69 so that the liquid delivered to the valve 67 would be delivered into the cylinder 36 at one side of the piston 49 or the other depending upon the position of movement of the control valve 67. Communicating with this control valve is the return pipe 70 which connects to the return pipe 71 of the four-way solenoid operated control valve 72. This valve is also of the stay-put type. The delivery pipe 64 communicates through this valve 72 and the pipe 73 with the cylinder 55 at one side of the piston 56. This valve 72 also communicates through the pipe 74, the feed control valve 75 and the pipe 76 with the cylinder 55 at the other side of the piston 56. The valve 75 is used to regulate the quantity or volume of the liquid delivered into the cylinder 55 at one side of the piston 56 so that the speed or rate of travel of the piston 56 may be varied.

The construction is such that when the valve 72 is turned to admit oil into the cylinder 55 at one side of the piston 56, the opposite side of the cylinder will be in communication with the outlet return pipe 71. When the valve 72 is operated to admit oil into the cylinder 55 back of the piston 56, that is, to the right of the piston 56, as illustrated in Fig. 4, the slide plate 30 will be moved to the left of the drawing shown in Fig. 1 and when the valve 72 is operated to admit oil into the cylinder 55 in front of the piston 56, that is, to the left of the piston, as shown in Fig. 4, the slide plate 30 will be moved in the opposite direction to the normal or starting position.

When the valve 67 is operated to admit oil into the cylinder 36 above the piston 49, the piston 49 will be moved downwardly and the cylinder 36, below the piston 49, will be in communication with the return pipe 70. When the valve 67 is operated to deliver oil through the pipe 68 into the cylinder 36, below the piston 49, the cylinder 36 will be in communication through its upper end through the pipe 69 and the valve 67 with the return pipe 70 and the piston 49 will be forced upwardly.

Mounted on suitable supports 77 and 78 is an angle iron or supporting table 79 which projects outwardly from one side of the member 17. This angle iron carries the supporting arms 80 which are connected by the rod 81 so that the workpiece slides along the support 79. As this workpiece slides along the support 79, the end thereof will be brought into contact with the head 82 mounted on the tubular plunger 83. This plunger 83 is slideably mounted in the bushing 84 which is pressed into the bearing 85 forming a part of a carriage which has the downwardly projecting legs 86 and 87 provided with rollers 88 and 89, respectively, which engage in tracks 90. The tracks 90 are mounted fixedly on a plate 91 which is positioned on the base of the angle iron 79. This angle iron, including the plate 91, may be moved upwardly or downwardly by adjusting the heights of the standards 77 and 78 so that the end of the stock 53, when the feeding has reached a certain distance, will engage the head 82 and force it inwardly against the compression of the spring 92 which engages at one end the end of the tube 83 and at the opposite end the pin 93 which is projected through the hollow body 94. A contact head 95 is pressed into the inner end of the member 83 and serves, when the member 83 is pressed inwardly against the compression of the spring 92 to engage a roller 96 mounted on the shaft 97 which is projected through the contact head 98 carried by the arm 99 rockably mounted on the shaft 101. When the arm 99 is rocked, the head 98 will serve to engage the plunger 102 of a switch which is enclosed in the housing 103 held in the barrel 104 by means of the screw cap 105.

The standards 86 and 87 project downwardly from a superstructure a portion of which comprises the laterally projected bracket 106 on which is mounted a solenoid embodying the coil 107 and the core 108. The core 108 is connected by the link 109 to one end of an arm 110 which is fixed to and projects outwardly from a rocker shaft 111 carrying an upwardly projecting kick-off bar 112. When the rocker shaft 111 is rocked in one direction, the kick-off bar 112 serves to engage the workpiece and forcibly push it off of the angle iron 79 or other support on which it may be positioned. This shaft 111 is rocked upon the upward movement of the core 108 and this core 108 is moved upwardly upon the energizing of the coil 107.

In operation, the switch 113 which controls the operation of the electric motor 19 would be closed so that the pumps 20 and 20' would be operating continuously. The pump 20 would, of course, develop a higher pressure than the pump 20' due to the fact that the pump 20 has more work to perform. The valve 75 would be adjusted to the proper position and to this end I provide a handle 75' accessible from the exterior of the member 17. The plate 91 would be moved to the proper distance on the member 70 and clamped in position by means of the clamping mechanism embodying the L-shaped slide shoe 114 in the overhanging part of which is threaded the stem 116. This clamping shoe is slideable along the angle iron 79 and may be locked in various positions thereon by means of the screw 116 to clamp the plate 91 in fixed relation on the angle iron 79. The location of the plate 91 on the angle iron will, of course, depend upon the length of cut of the material 53 which it would be necessary to make. If the material is fed through the dies, the end thereof would strike the head 82 and serve to close the switch in the housing 103. This switch may be termed the limit switch No. 1 and is designated in the diagrammatic view by the numeral 115. The cable 116 serves to conduct the wiring to the switch 115 and is adapted for being wound upon the reel 117. Limit switch No. 2 indicated by the numeral 118 is closed when the slide plate 30 is in its fully retrieved or starting position. This switch is held in closed position by a boss 119 projecting downwardly from the slide plate 30 and adapted to engage the switch controlling arm 120. Upon the closing of the switch 115, the relay embodying the coil 121 and the contacts 122 would be closed so that the coil 123 moving the valve 72 to forward open position would be energized and the valve 72 opened to admit liquid through the pipe 73 into the cylinder 55 thus moving the slide plate 30 to the left of Fig. 1. At the same time the coil 124 controlling the operation of the valve 67 would be energized and the valve 67 would be moved to open position for admitting liquid through the pipe 69 into the cylinder 36 thus starting the piston 49 on its downward travel. These valves 72 and 67 would remain in this position and as the slide plate 30 moves to the left, the boss 119 would disengage from the switch arm 120 opening this switch 118. The travel of the slide plate 30 carrying with it the cover 21 and the standard 32 would, of course, be timed to correspond to the speed of travel of the workpiece so that as the piston rod 50 forces the cutter into the workpiece, the cutting tool and the piston rod and all of the mechanisms are engaging simultaneously with the workpiece at the same speed. In this movement, the limit switch No. 3 which may be termed switch 125, would be open and limit switch No. 4, indicated by the numeral 126, would be closed. When the slide plate 30 would have traveled a predetermined distance, during the time of which travel the cutting operation would have been completed, the boss 127 carried by the piston rod 50 would engage the switch arm 128 and open the limit switch No. 4 indicated by the numeral 126. This switch 126 would be open just as the piston 50 reaches the completion of its downward movement and at the same time the boss 129 projecting downwardly from the slide plate 30 would engage the switch arm 130 and close limit switch No. 3 or the switch indicated by the numeral 125. It will be remembered that the circuit to the magnetic coils controlling the operation of the valves 72 and 67 has already been broken by an opening of the switch 118 resulting from a release of the arm 120 by the boss 119. With limit switch No. 3 or switch 125 closed, the relay embodying the coil 131 and the contacts 132 would be operated to energize the coil 133 operating the control valve 67 thus delivering liquid through the pipe 68 although the cylinders 36 are starting the piston 49 on its upward movement. This upward movement would continue while the slide plate 30 is traveling in unison with the workpiece until the cutting tool had cleared the workpiece and just as the cutting tool clears the workpiece, the boss 127 will ride off of the end of the arm 128 permitting this arm to spring outwardly and close limit switch No. 4 or the switch indicated as switch 126. In this instance switches 125 and 126 would both be closed and the piston 49 would continue its upward movement. The relay embodying the coil 134 and the contacts 135 would be operated so that the coil 136 would be energized, this coil 136 controlling the operation of the valve 72. Thus the valve 72 would be operated to admit liquid through the pipe 76 into the cylinder 55 tending to move the plate into its original starting position. At the same time, the coil 107 would be energized to pull the core 108 upwardly so as to rock the shaft 111 and kick the cut-off piece of metal from the support. As the slide 30 moves to its initial position the limit switch No. 2 or switch 118 would be closed and the disengagement of the workpiece from the head 82 would allow switch 115 to move to open position.

As the workpiece engages the head 82 and forces the tubular member 83 inwardly its full distance, the framework supported by the standards 86 and 87 will travel to the left of Fig. 1 but this framework is connected to the plate 30 by means of the messenger wire 138 so that a uniform distance between the framework embodying the standards 86 and 87 and the slide plate 30 is maintained. In order to prevent this framework embodying these standards, in the return movement, from moving to the right beyond normal position, I have provided a weight 139 connected by the wire 140 to the framework and adapted to travel over the sheath 141.

It is thus apparent that I have provided a hydraulic mechanism of this type which is automatic in its operations and in which the speed of travel of the slide plate 30 may be varied. Consequently, the mechanism may be timed to accord with different speeds of travel of the workpiece. While I have indicated the machine as being a cut-off machine, it is believed obvious that it is also adapted for other purposes such as for marking strips of metal at spaced points, punching holes therein, slotting, and similarly operating upon a traveling strip of metal at spaced points. It is also believed obvious that the operation of the machine is determined by contact with the end of the strip of material.

While I have illustrated and described the preferred form of construction, I do not wish to limit myself to the precise details of structure shown, but desire to avail myself of such variations and modifications as may come within the scope of the appended claims.

What I claim as new is:

1. A machine of the class described, adapted for operating on a traveling workpiece, comprising: a slideably mounted slide plate; hydraulic means for reciprocating said slide plate; a work tool for operating on said workpiece; a holder for said tool movable toward and away from said workpiece; a supporting member movable in unison with said slide plate for supporting said tool holder; hydraulic means for moving said tool holder toward and away from said workpiece; control means for controlling the operation of said last-named hydraulic means and effecting a movement of said tool holder toward said workpiece upon the sliding of said plate in one direction during the sliding movement of said plate in said direction a predetermined distance; means for controlling said first-named hydraulic means for effecting a slideable movement of said slide plate in said direction; means for controlling said second-named hydraulic means for effecting a movement of said tool holder away from said workpiece upon movement of said slide plate in said direction, said predetermined distance; and control means for effecting the operation of said first-named hydraulic means for moving said slide plate in the opposite direction, upon the movement of said tool holder away from said workpiece a predetermined distance.

2. A machine of the class described, adapted for operating on a traveling workpiece, comprising: a slideably mounted slide plate; hydraulic means for reciprocating said slide plate; a work tool for operating on said workpiece; a holder for said tool movable toward and away from said workpiece; a supporting member movable in unison with said slide plate for supporting said tool holder; hydraulic means for moving said tool holder toward and away from said workpiece; control means for controlling the operation of said last-named hydraulic means and effecting a movement of said tool holder toward said workpiece upon the sliding of said plate in one direction during the sliding movement of said plate in said direction a predetermined distance; means for controlling said first-named hydraulic means for effecting a slideable movement of said slide plate in said direction; means for controlling said second-named hydraulic means for effecting a movement of said tool holder away from said workpiece upon movement of said slide plate in said direction, said predetermined distance; control means for effecting the operation of said first-named hydraulic means for moving said slide plate in the opposite direction, upon the movement of said tool holder away from said workpiece a predetermined distance; and means for regulating the speed of operation of each of said hydraulic means.

3. A machine of the class described, adapted for operating upon a traveling workpiece fed therethrough, comprising: a slideably mounted slide plate; hydraulic means for reciprocating said slide plate; a work tool for operating on said workpiece; a tool holder for said work tool; hydraulic means for moving said tool holder toward and away from said workpiece; control means engageable with said workpiece and adapted, upon engagement therewith, for effecting the operation of each of said hydraulic means for sliding said slide plate in one direction and moving said tool holder toward said workpiece for operating thereon; a control means operable, upon the sliding of said slide plate a predetermined distance, for effecting the operation of said second-named hydraulic means for moving said tool holder away from said workpiece; and means operable, upon the movement of said tool holder away from said workpiece a predetermined distance, for operating said first-named hydraulic means for moving said slide plate in the opposite direction.

4. A machine of the class described, adapted for operating upon a traveling workpiece fed therethrough, comprising: a slideably mounted slide plate; hydraulic means for reciprocating said slide plate; a work tool for operating on said workpiece; a tool holder for said work tool; hydraulic means for moving said tool holder toward and away from said workpiece; control means engageable with said workpiece and adapted, upon engagement therewith, for effecting the operation of each of said hydraulic means for sliding said slide plate in one direction and moving said tool holder toward said workpiece for operating thereon; a control means operable, upon the sliding of said slide plate a predetermined distance, for effecting the operation of said second-named hydraulic means for moving said tool holder away from said workpiece; means operable, upon the movement of said tool holder away from said workpiece a predetermined distance, for operating said first-named hydraulic means for moving said slide plate in the opposite direction; and a supporting member movable in unison with said slide plate for supporting said second-named hydraulic means and said tool holder.

5. A machine of the class described, adapted for operating upon a traveling workpiece fed therethrough, comprising: a slideably mounted slide plate; hydraulic means for reciprocating said slide plate; a work tool for operating on said workpiece; a tool holder for said work tool; hydraulic means for moving said tool holder toward and away from said workpiece; control means engageable with said workpiece and adapted, upon engagement therewith, for effecting the operation of each of said hydraulic means for sliding said slide plate in one direction and moving said tool holder toward said workpiece for operating thereon; a control means operable, upon the sliding of said slide plate a predetermined distance, for effecting the operation of said second-named hydraulic means for moving said tool holder away from said workpiece; means operable, upon the movement of said tool holder away from said workpiece a predetermined distance, for operating said first-named hydraulic means for moving said slide plate in the opposite direction; a supporting member movable in unison with said slide plate for supporting said second-named hydraulic means and said tool holder; and adjustable means on said supporting member for adjusting the position of said second-named hydraulic means thereon.

6. A machine of the class described, adapted for operating on a traveling workpiece fed therethrough, comprising: a slideably mounted slide plate; hydraulic means for reciprocating said slide plate; a tool holder; a tool mounted on said tool holder and movable toward and away from the workpiece; hydraulic means for reciprocating said tool holder; means for mounting said second-named hydraulic means on said slide plate for movement in unison therewith; a control mechanism engageable with the traveling workpiece and adapted upon engagement therewith for operating said first-named hydraulic means for sliding said slide plate in one direction and said second-named hydraulic means for moving the work tool toward the workpiece; means operable, upon the sliding of said slide plate a predetermined distance, for controlling the operation of said second-named hydraulic means for effecting a movement of said work tool away from said workpiece; and control means operable upon the movement of said work tool away from said workpiece a predetermined distance for effecting an operation of said first-named hydraulic means for moving said slide plate in the opposite direction.

7. A machine of the class described, adapted for operating on a traveling workpiece fed therethrough, comprising: a slidably mounted slide plate; hydraulic means for reciprocating said slide plate; a tool holder; a tool mounted on said tool holder and movable toward and away from the workpiece; hydraulic means for reciprocating said tool holder; means for mounting said second-named hydraulic means on said slide plate for movement in unison therewith; a control mechanism engageable with the traveling workpiece and adapted upon engagement therewith for operating said first-named hydraulic means for sliding said slide plate in one direction and said second-named hydraulic means for moving the work tool toward the workpiece; means operable, upon the sliding of said slide plate a predetermined distance, for controlling the operation of said second-named hydraulic means for effecting a movement of said work tool away from said workpiece; control means operable upon the movement of said work tool away from said workpiece a predetermined distance for effecting an operation of said first-named hydraulic means for moving said slide plate in the opposite direction; and manually operable means for regulating the speed of operation of each of said hydraulic means.

8. A machine of the class described, adapted for operating on a traveling workpiece fed therethrough, comprising: a slideably mounted slide plate; hydraulic means for reciprocating said slide plate; a tool holder; a tool mounted on said tool holder and movable toward and away from the workpiece; hydraulic means for reciprocating said tool holder; means for mounting said second-named hydraulic means on said slide plate for movement in unison therewith; a control mechanism engageable with the traveling workpiece and adapted upon engagement therewith for operating said first-named hydraulic means for sliding said slide plate in one direction and said second-named hydraulic means for moving the work tool toward the workpiece; means operable, upon the sliding of said slide plate a predetermined distance, for controlling the operation of said second-named hydraulic means for effecting a movement of said work tool away from said workpiece; control means operable upon the movement of said work tool away from said workpiece a predetermined distance for effecting an operation of said first-named hydraulic means for moving said slide plate in the opposite direction; manually operable means for regulating the speed of operation of each of said hydraulic means; a mechanism for removing said workpiece out of engagement with said first-named control means; and means for operating said removing mechanism simultaneously with the beginning of travel of said slide plate in said opposite direction.

MARTIN J. FLEMING.